United States Patent
Chen et al.

(10) Patent No.: US 7,486,114 B2
(45) Date of Patent: Feb. 3, 2009

(54) SIGNAL DETECTOR WITH CALIBRATION CIRCUIT ARRANGEMENT

(75) Inventors: Minhan Chen, Cary, NC (US); Louis Hsu, Fishkill, NY (US); Joseph Natonio, Wappingers Falls, NY (US); Karl D. Selander, Hopewell Junction, NY (US); Michael A. Sorna, Hopewell Junction, NY (US); Steven J. Zier, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 11/383,821

(22) Filed: May 17, 2006

(65) Prior Publication Data

US 2007/0271054 A1    Nov. 22, 2007

(51) Int. Cl.
*H03K 5/19* (2006.01)
(52) U.S. Cl. .......................... 327/20; 327/65
(58) Field of Classification Search .................. None
See application file for complete search history.

(56) References Cited

U.S. PATENT DOCUMENTS

| | | | |
|---|---|---|---|
| 5,789,974 A | 8/1998 | Ferguson et al. | |
| 5,821,795 A * | 10/1998 | Yasuda et al. | 327/307 |
| 6,246,268 B1 * | 6/2001 | Cheng | 327/65 |
| 6,366,622 B1 | 4/2002 | Brown et al. | |
| 6,745,015 B2 | 6/2004 | Yochem | |
| 6,756,924 B2 * | 6/2004 | Lee et al. | 341/120 |
| 6,897,712 B2 * | 5/2005 | Ficken et al. | 327/537 |
| 7,102,392 B2 * | 9/2006 | Hsu et al. | 327/20 |
| 7,271,649 B2 * | 9/2007 | Chiu et al. | 330/9 |
| 2002/0094788 A1 | 7/2002 | Hayashi et al. | |
| 2005/0219092 A1 | 10/2005 | Chang et al. | |
| 2005/0221763 A1 * | 10/2005 | Song | 455/67.11 |
| 2005/0235159 A1 | 10/2005 | Anandukumar et al. | |

OTHER PUBLICATIONS

TTP Communications Ltd., bobhenshaw@ttpcom.com, "GSM/DCS1800 Dual Band Direct-Conversion Transceiver IC with a DC Offset Calibration System" an Hitachi paper on the IC, no date.

* cited by examiner

*Primary Examiner*—Cassandra Cox
(74) *Attorney, Agent, or Firm*—Joscelyn G. Cockburn (57) ABSTRACT

A signal detector and method to detect the presence or absence of an incoming differential signal. The method nullifies the DC off-set of the signal detector so that it can detect a signal within a very narrow window. The common mode levels of the signal and reference paths are used for calibration which is done automatically by use of an embedded algorithm residing in a digital block. The calibration range and resolution are predetermined to cope with the technology, modeling, design methodology and human error.

35 Claims, 9 Drawing Sheets

SIGNAL DETECTOR WITH CALIBRATION CIRCUIT ARRANGEMENT

CROSS REFERENCE TO RELATED APPLICATION

The present application is related to commonly owned, co-pending U.S. patent application Ser. No. 10/604,799 entitled "Apparatus and Method for Detecting Loss of a High Speed Signal" and Ser. No. 10/905,704 entitled "Improved Signal Detector for High Speed Serdes". Both patent applications, in their respective entirely, are incorporated by reference as if fully set forth herein.

FIELD OF THE INVENTION

The present invention relates to signal detection circuits in general and in particular to circuits for detecting both presence and absence of incoming differential signals in duplex Serdes (Serial-Deserialize) communications links.

BACKGROUND OF THE INVENTION

In contemporary high-speed serial data communications, a duplex high-speed serial (HSS) communication link is typically implemented by an integrated circuit ("IC" or "chip") that includes at least one pair of a serializer (transmitter) and a deserializer (receiver) on the same chip. Such elements can also be combined in a core, referred to as a serializer-deserializer (SerDes) core, which can subsequently be incorporated into a multi-function chip. At a transmitting end of a serial link, the transmitter of a SerDes core takes a set of parallel data signals at a moderate switching speed and converts them to a high switching speed serial signal for transmission to a remote receiver. At the remote end of the link, the receiver portion of the SerDes core receives the high switching speed serial signal and deserializes it back into a set of parallel data signals at a moderate switching speed.

When a serial data signal first arrives at the front end of a receiver from off of the chip, the serial data signal is processed to check whether it represents a valid signal. Then the switching speed and phase of the clock are recovered from the serial data signal. Next, the serial data signal is sampled by the recovered clock to capture the data transmitted therein. The signal obtained by sampling is then latched into the receiver and deserialized to provide a number of parallel output signals.

The steps of clock recovery and sampling to recover the transmitted data presume the existence of a valid serial data signal, as distinguished from a loss-of-signal condition. Unless the conductors attached at the input to the receiver are carrying a "good" serial data signal, resources and time could be wasted by the receiver processing invalid or unreliable input. Furthermore, invalid data has the potential of causing system errors.

It is therefore desirable for high-speed serial data receivers to have a signal detecting apparatus to quickly and reliably distinguish a "good" serial data signal from a "bad" one. A "bad" signal can occur, for example, when conductors, e.g. a pair of conductors of a coaxial cable, that carry a signal are unintentionally disconnected, such being referred to as "loss-of-line". A "bad" signal can also occur if the signal conductors become damaged or temporarily interrupted. "Bad" signals also occur when there are voltage or current spikes on the signal conductors, as may be caused by cross-talk or inductive or capacitive coupling from interfering sources. At such times, the magnitude of the incoming signals to the receiver is lower than the low signal limit defined by the customer specification.

When loss-of-signal occurs, some types of receivers that are equipped with an automatic gain control (AGC) loop incorporated with a decision feedback equalizer ("DFE") feature may incorrectly attempt to restore the signal by increasing the gain at the receiver's front end. In such a case, instead of finding and recovering a good data signal, the receiver might instead amplify the cross-talk noise that appears on the input signal conductors and then proceed in attempting to receive that noise as the transmitted signal. In order to avoid such outcome, it is important for the receiver to detect when the input signal is bad as early as possible. It is desirable that the receiver detects a loss-of-signal condition immediately such that an incoming data packet can be dropped and retransmission of the packet can then be requested. Such operation is critical to maintain the throughput and reliability that are needed when the receiver is used, for example, in security, banking, trading and other such industries.

Various approaches have been taken in prior art systems to determine a loss-of-signal condition. For example, in the article "A Novel High Speed CMOS Signal Transition Detector Circuit," *Research Disclosure*, Apr. 16, 2001, a comparator having an offset is used to determine whether the input signal has moved by a predetermined amount away from its quiescent state. If the input signal is transitioning, the detector concludes that the input signal is valid. Otherwise, if the input signal is not transitioning, the detector concludes that the input signal is not valid. However, the system disclosed in that article is not robust, possibly falsely detecting a good signal when a voltage or current spike appears, and having difficulty detecting valid signals in systems having a serial data transmission rate of 5 Gbs and higher.

In another system described in U.S. Pat. No. 6,377,082 B1 (hereinafter "the '082 patent") issued Apr. 23, 2003 to Loinaz et al., a signal detector includes (1) a transition detector for detecting stuck-on-one and stuck-on-zero loss-of-signal (L-O-S) conditions, and (2) an inconsistency detector for detecting random and undersized signals. A disadvantage of the system described in the '082 patent is that it cannot proceed without having recovered a good clock from the input data signal at the beginning of a data communication period. Hence, the input data signal must be known to be a good signal at the beginning of the data communication period in order for the clock to be recovered. The recovered clock is thereafter used to sample the input data signal in each of two different decision circuits to provide intermediate outputs for deciding whether the input data signal is valid. However, if the input signal is bad from the beginning, the clock may not be present or may be unreliable and incapable of accurately sampling the input signal, making the loss-of-signal detector fail to work at all.

Another problem of the system described in the '082 patent is that it only permits a fixed signal threshold level setting for detecting loss-of-signal. However, it is desirable for a SerDes core to operate according to multiple different specifications and support multiple different speeds and operating voltages. As a result, in communication systems using SerDes cores, a good signal threshold for one system can sometimes resemble noise in others.

In another system, described in U.S. Pat. No. 6,246,268 B1 to Cheng, issued Jun. 12, 2001 (herein after "the '268 patent") a CMOS signal detection circuit includes (1) a low-pass filter, (2) a high-pass filter, (3) a built-in offset generator and a (4) comparator. The CMOS signal detection circuit is designed to detect an incoming differential signal within a certain frequency range and signal strength. Signals having a predetermined frequency between the cutoff frequencies of the high pass filter and low pass filter are passed to a comparator element of the detector. In the comparator, only signals strong enough to overcome a built-in offset of the comparator result in an output detection signal. As in the above system described in the '082 patent, this system also cannot operate over the wide range of signal frequencies and voltage levels that are desirable for SerDes cores.

In view of the above a robust signal detector that can detect the presence and absence of input signals within a predetermined time interval is needed.

SUMMARY OF THE INVENTION

The challenges of designing a robust signal detector are: (1) one design must fit for a wide-range of power supplies (e.g. 1.0V to 1.95V), a wide-range of incoming signal frequencies (e.g. DC to 3.2 GHz), (2) very small difference between signal and noise amplitudes, e.g. signal amplitude less than 42.5 mV is noise and greater than 87.5 mV is valid signal, and (3) must cope with a wide range of process variation, device mismatch and operating temperature.

In order to meet the challenges one object of the present invention is to provide a signal detector to operate over a wide range of signal frequencies, power supplies, temperature variation, input signal common mode levels and amplitudes.

It is another object of the invention that the performance of signal detector is not sensitive to process variation including device mismatch caused by process tolerance of channel doping, critical dimension control, gate oxide thickness, parasitic loading and device variation due to proximity to well and shallow trench isolation.

It is still another object of the invention to provide a signal detector in which a threshold level can vary according to conditions in which the SerDes core is being used. The present invention provides a calibratable signal detector system including a pair of signal lines which receive incoming differential signals, a level generator with an IDAC-1 (current base digital-to-analog-converter) level setting calibrator, calibration switch circuit, a merged buffer detector with an IDAC-2 off-set calibrator, and comparator. A firm wave module includes a program that generates digital signals to drive IDAC-2 off-set calibrator. The named components are coupled together and function as set forth in the figures and description set forth herein.

The invention also describes method for calibrating the signal detector. According to an aspect of the method, during power on or other selected interval, the signal detector is calibrated by IDAC-2 off-set calibrator using a known internal reference level signal provided by the level generator/IDAC-1 level setting generator. The purpose of the calibration is to eliminate the inherent differential signal imbalance due to device mismatch, including device size difference between two differential pairs, mirror devices, load resistors, threshold mismatch of a pair of matching sensitive devices, etc.

Since the signal detector of the present invention is calibratable it can be tuned to meet the most stringent requirements of a user specification including the current Infiniband specification with a very tight signal detection ranger, i.e. 87.5-175 mVppd. (Note: Inventor explain "mVppd") To the best of our knowledge, this specification has never been met before across the industry.

DETAILED DESCRIPTION OF THE INVENTION

Designing a robust signal detector to meet a wide range of customer specifications is definitely not an easy task. The task includes the requirement of detecting incoming signals with a narrow signal amplitude window and spanning wide ranges of signal frequency, common mode level, supply voltage, and operating temperature. The goal is to design a single signal detector that fits these and other requirements. The one design fits all is certainly an ideal goal in an ASIC environment to save development, manufacturing, testing and maintenance cost. Some customer specifications have a very small margin separating valid signal amplitude from noise. For example, in the Infiniband architecture specification, signal and noise peak-to peak amplitudes are defined as 87.5 mV and 42.5 mV, respectively. In other words, a signal detector must detect the presence of valid signal when the incoming signal has a peak-to-peak amplitude greater than 87.5 mV. On the other hand, it must detect absence of valid signals when the peak-to-peak signal amplitude is lower than 42.5 mV. Depending on the data patterns, the frequency of the signals can range from a few tens of MHz with series of continuous "1s" and "0s", to several GHz with alternating "1" and "0". The common mode level, depending on whether it is an AC or DC coupled system, may vary from power supply level down to a fraction of the supply level. It is also important that signal detector must detect the presence and absence of a valid signal within a certain period of time for some applications. The challenges of designing a robust signal detector to meet the requirements mentioned above are: (1) it must be small in size, (2) low power, (3) tolerable to process variation, (4) it must function at a wide range of temperature variation, (5) wide range of operation voltage variation and (6) be easy to test.

From a process point of view, the DC offset in differential signals due to device mismatch can easily wipe out the full valid signal range (42.5 mV). The mismatch can result from well proximity effect, shallow trench isolation effect, non-uniform process and parasitic loading unbalance in circuit layout. The well proximity effect has been extensively investigated. The threshold voltage of a MOS device depends on its location in relationship to the edge of well boundary. It is because the boron ions are scattered from the edges of hard mask. Devices with different distance away from the boundary could result in different threshold levels due to non-uniform dopant concentration. Similarly, devices having different distance to the edges of shallow trench isolation also suffer different threshold levels due to stress induced dopant segregation effect. Therefore, two matching sensitive devices located slightly different distance to the boundary of well or shallow trench isolation will end up with different threshold levels and thus produce mismatch.

On the other hand, different amounts of capacitive or resistive parasitic coupled to a matching sensitive pair would also force devices to be unbalanced. For example, in the physical layout, one wire may run over one device but not the other. It will cause two devices to have slightly different parasitic loading. None of these effects can fully be avoided without incurring a large area penalty. For example, using dummy gate structures to keep the matching devices a greater distance from the edges of wells and isolations could results in better matching, but at the cost of area.

Therefore, it is desirable to design a signal detector to meet the very tight signal specification. The desire is met by a calibration method that eliminates DC offset caused by such inevitable mismatch. Preferably, the calibration method is practiced during power on or other selected time interval.

Figure 1:
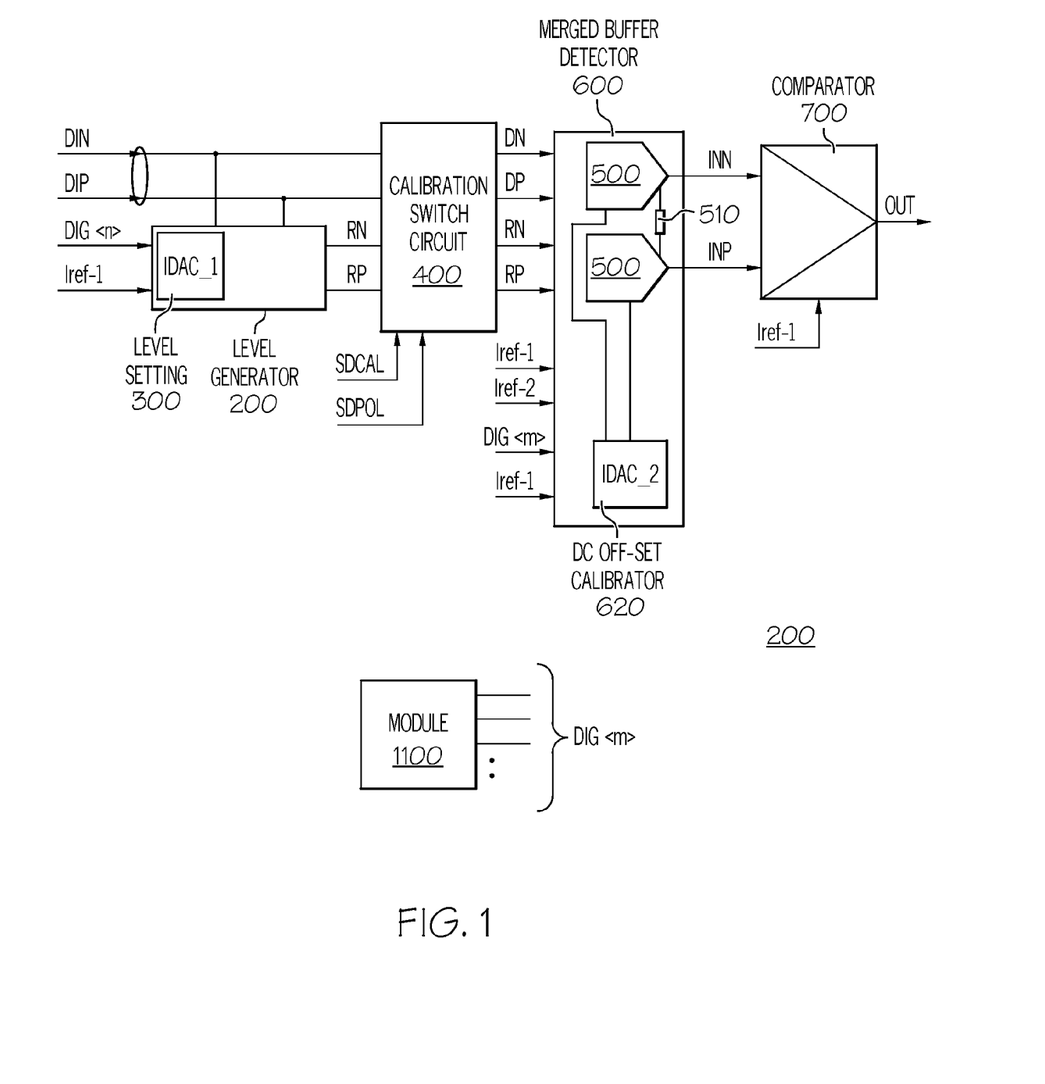
FIG. 1 is a block diagram illustrating the signal detector according to teachings of the present invention.

FIG. 1 shows a schematic of a signal detector system according to teachings of the present invention. In this new design, a reference level setting element 300, DC off-set calibration element 620, a calibration switch unit 400 and a reference level generator unit 200 are provided. The system nullifies the DC offset caused by "mismatch" devices. The system also adjusts to compensate for variation in power supply and or variation in signal frequencies. In this example, two current references, e.g. Iref-1 and Iref-2, with 50 uA and 12.5 uA, respectively, are provided. Two sets of digital control bits DIG<n> and DIG<m> are used to perform reference level setting and DC off-set calibration, respectively. The reference level setting compensates for variation in power supply voltage and signals frequency variation. The digital control bits DIG<m> are provided by module 1100 (FIG. 1).

In principle, during calibration mode, set control signal SDCAL=1. The calibration switch 400 will block the high frequency differential input signals DIN/DIP so that the signal path as well as the reference path are routed with the identical predetermined reference level signal that is generated by the level generator 200 and IDAC-1. This reference level can be preset to meet different customer specifications under different power supply levels. At this moment, any DC offset embedded in the design is calibrated out by DC off-set calibrator 620, also identified as IDAC-2. This calibration is carried out sequentially with the first polarity on the first leg DN of the differential pair DN/DP with the control signal-SDPOL set to logical "0" and then the second polarity on the second leg DP of the differential pair DN/DP with the control bit SDPOL set to logical "1". More details of the calibration method are set forth below.

An algorithm shown in FIG. 9 and described below is designed so that the reference level is finally set at the average value between the first and second polarity readings. At this point, any built-in DC offset caused by mismatch along the signal path is compensated by the final reference setting. Detail circuit schematics and descriptions for the components shown in block diagram form in FIG. 1 will now be given.

Figure 2:
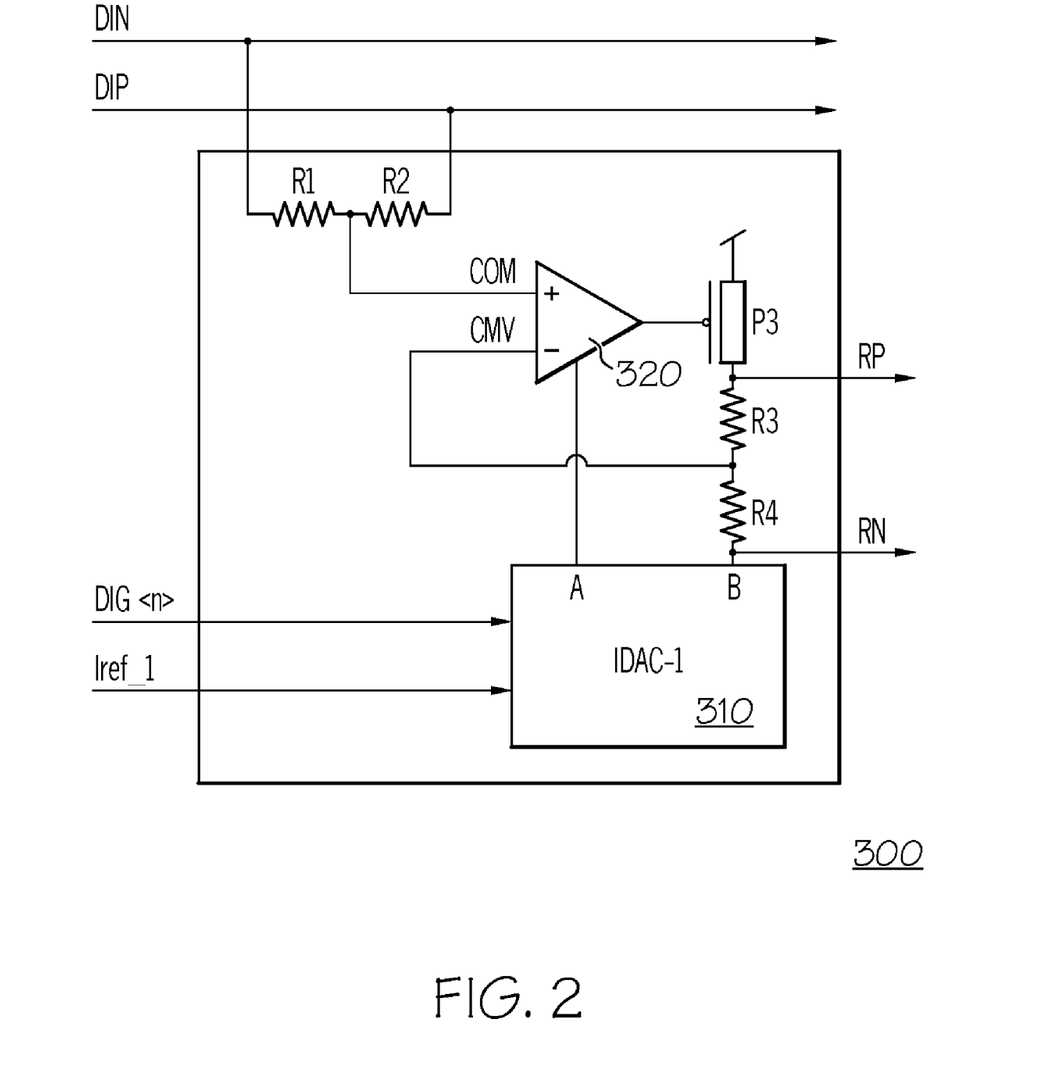
FIG. 2 is a block diagram illustrating level generator according to an embodiment of the invention.

FIG. 2 shows DC reference level generator according to teachings of the present invention. A first identical resistor pair R1 and R2 with values in the range of kilo-ohm is used to detect the common mode level "COM" via the incoming differential signal pair DIN/DIP. For simplicity it should be noted both signal and conductor carrying the signal is identified by common alphabetical character or common numerals. For example, DIN/DIP can be used to identify the differential signals or the conductors or wires carrying the signals. Each use will be accompanied by proper identifier (signal or conductor). A second identical resistor pair R3 and R4 with values in the range of 500 ohms is used to generate complimentary reference levels at RP and RN via a proper amount of current passing through resistor pair R3 and R4. For example, if the upper limit of the signal is 87.5 mV, and lower limit is 42.5 mV, the reference level may be set at the middle which is 65 mV above and below the common mode for sensing the signals. A differential amplifier 320 is used with a negative feedback loop to hold the voltage level at node CMV to be substantially close to the common mode level COM. During calibration, proper incoming signals are necessary in order to provide the common mode voltage at node CMV. pMOS device $P_3$ interconnects the output of differential amplifier 320 to power supply vs. It should be noted conductors DIN and DIP define the beginning of an incoming signal transmission path as where conductor RP and RN define the beginning of a reference signal transmission path. Both the incoming signal transmission path and the reference signal transmission path extend through the signal detector.

Still referring to FIG. 2, the level generator circuit 300 further comprises IDAC-1 (current-based digital-to-analog converter) 310 which is utilized to directly provide programmable tail current for the output gain stage of differential amplifier 320, a source follower formed by pMOS P3 and resistor chain R3 and R4. Control vector bits DIG<n> are used for two purposes: (1) to set the predetermined reference level at RP and RN so that it would meet the signal specification under the current power supply level. For example, for 1.1V-1.3 V supply, DIG<0>=1, DIG<1>=1; for 1.3-1.6V supply, DIG<0>=1, DIG<1>=0, and for 1.6V-1.9V supply, DIG<0>=0 and DID<1>=0, etc. This is because the output of the source follower is sensitive to the power supply level. (2) to fine tune the reference level so that a desirable reference level can be obtained to meet different signal specifications under different power supply levels. In addition, IDAC circuit 310 provides tunability for the tail current of the differential amplifier via node "A".

Figure 3:
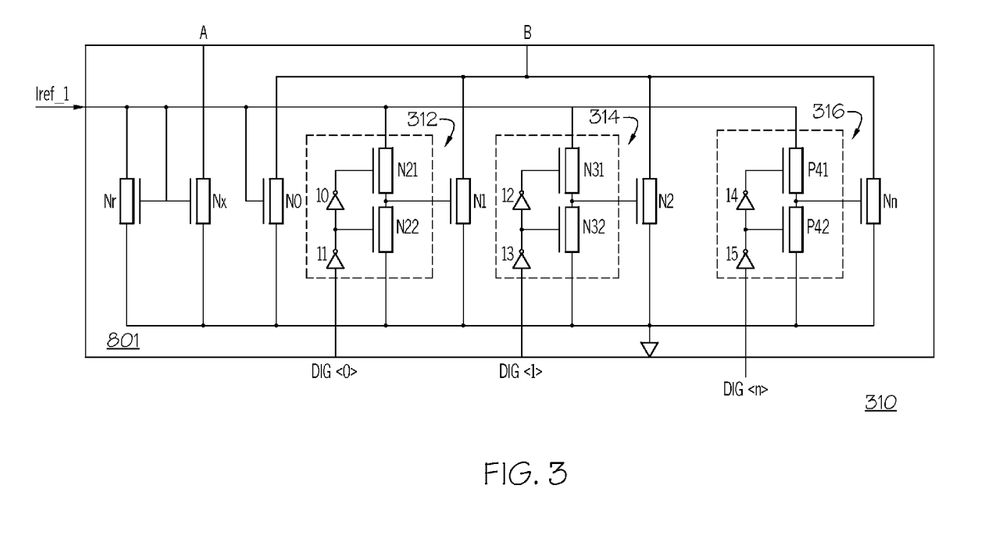
FIG. 3 is a schematic diagram illustrating IDAC-1, the first tuning circuit of a signal detector according to an embodiment of the invention.

FIG. 3 shows a schematic of a circuit for IDAC-1 (310) FIG. 2, sourcing current from Node A and Node B, respectively. The circuit includes a main diode $N_r$ providing current I ref-1 to mirror devices $N_x$, $N_0$, $N_1$, $N_2$ and $N_n$. Each of the mirror devices N1, N2 and Nn is switched by control circuits 312, 314 and 316, respectively. The control circuits are identical including pairs of series connected inverters (10,11,12, 13,14 and 15) coupled to pairs of series connected N devices $N_{21}$, $N_{22}$, $N_{31}$, $N_{32}$, $N_{41}$ and $N_{42}$.

IDAC-1 is used to allow the signal detector to detect a wide range of signals under a wide range of power supply voltages e.g. 1.2v to 1.95v. This means one design fits a wide range of different customer specification.

IDAC-1 (310) operates as follows: A reference current, Iref_1, (e.g. 50 uA to 200 uA) is mirrored from a main diode device Nr (here diode means its gate is tied to the drain) to a first mirror device Nx to produce a first tail current that drawn in node A. The amount of current that drawn from node A is proportional to width ratio of Nr device to Nx device. Similarly, Main diode device Nr further mirrors current to a plurality of devices including N1, N2 ... to Nn. The channel widths of these devices are arranged in a binary order. That is, the width of Nn is 2× of the width of Nn−1 and so forth. These devices are switched via two inverters connect in series. For example, the first device N1 can be switched on to mirror current by asserting vector bit DIG<0>=1, at this point, output of the first inverter I1 is "low" and thus turning off the NMOS N22 while the output of the second inverter I0 is "high" and thus turning on the NMOS N21. The gate of N1 device is now connected to the main diode device. Noted that the gate of the nMOS device N0 is always tied to the diode device Nr, there is a certain amount of current drawn from node B even if all the vector bits are set to zero. When vector bit DIG<0>=1, an extra amount of current is drawn from node B, and when vector bit DIG<1>=1, two times of extra amount current is drawn from node B, and so on.

Still referring to FIG. 3, control bits DIG<n> are used to adjust reference current through node B. While reference current through node A is just mirrored from Iref_1. With this IDAC design, a wide signal range can be successfully and repeatedly detected, e.g. from 50 Mbs to 6.4 Gbs. Moreover, by adjusting the reference level to about 65 mV (in the middle of 87.5 mV and 42.5 mV), the signal detector can be used to detect signal specified by the Infiniband specification. Similarly, by adjusting reference level to other levels, one can use this signal detector to meet XAUI, Fiber Channel, or other signal specifications. Furthermore, by fine-tuning the reference level via DIG<n> bits the signal detector can also be used in different receiver systems with different power supply levels. The signal detector is further adapted to detect the presence and absence of the signals within a preset latency time, e.g. 50 ns, so the system can respond rapidly to a loss-of-signal condition. It is guaranteed to function under a temperature range, e.g. −40 C to 125 C, and within a tolerable process variation.

Figure 4:
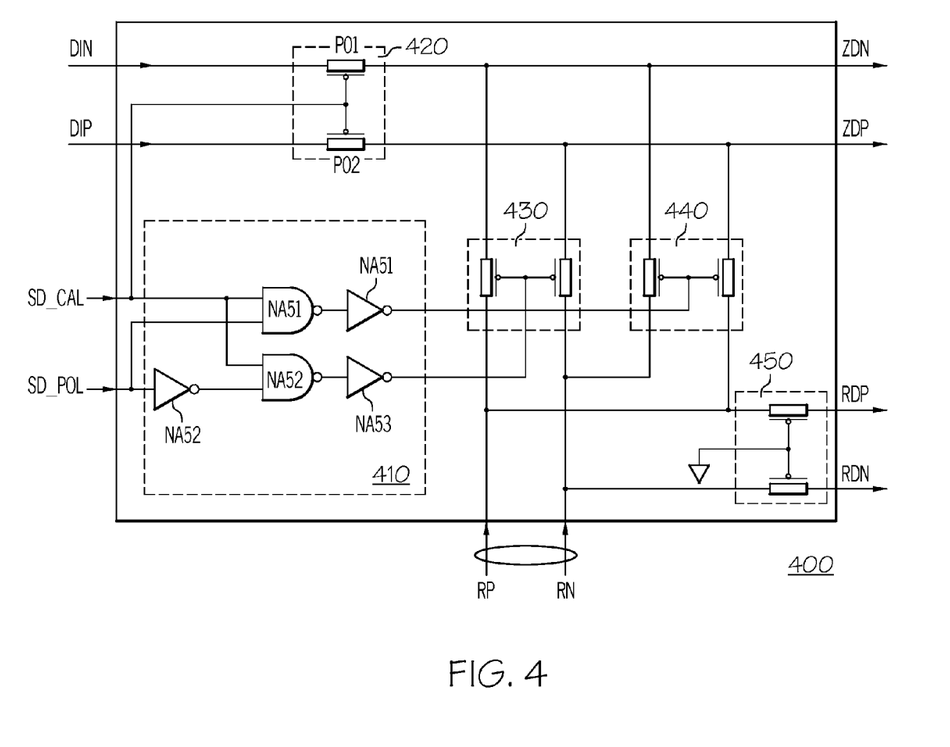
FIG. 4 is a schematic diagram illustrating a calibration switch for use as the first calibration element of a signal detector according to an embodiment of the invention.

FIG. 4 shows a schematic for calibration switch circuit 400 (FIG. 1), including multiplexer (MUX) 410, switches 420, 430, 440 and 450 interconnected as shown. Each switch includes a pair of series connected pMOS devices. The calibration switch is used to isolate incoming signals (DIN and DIP) during calibration mode. During calibration, an internally generated DC voltage levels (RN and RP) are used to calibrate DC offset of the signal detection system caused in part by imperfection of the layout and processing. The switch allows the system to perform calibration on the fly without affecting the normal operation of the receiver. In other words, during calibration the DC reference level RN and RP are routed to both signal and reference paths (ZDN, ZDP, RDP and RDN). The DC reference level RN and RP are used for DC offset calibration. After the calibration is over, high speed (250 MHz to 3.2 GHz) incoming data signals DIN and DIP are rerouted to the signal path for normal operation. At this moment, the system DC offset is nullified.

Referring again to FIG. 4, during the calibration mode, set control pin SD_CAL=1 which allows the calibration switch complex 400 to block the incoming differential signal DIN and DIP to pass to the signal path ZDN and ZDP via the first switch set 420. The switch 420 is formed by two pMOS devices P01 and P02. In this example, the isolation efficiency for a maximum of 2V peak-to-peak differential incoming signal as high as 99.8%. A multiplexer logic block 410, comprises three inverters, IN51, IN52 and IN53 and two NAND gates NA51 and NA52 all connected as shown, is used to allow the generated reference voltage at node RP to be connected to ZDN, and RN to be connected to ZDP when control pin SD_POL=1 via the second switch set 430. This setting is used for the first signal polarity calibration. After that, then RP is connected to ZDP and RN is connected to ZDN when SD_POL=0 via the third switch set 440. This setting is used for the second signal polarity calibration.

Still referring to FIG. 4, a dummy switch set 450 having size identical to that of other switch set is connected to the reference path, RDP and RDN. The purpose is to balance out signal attenuation caused by the switch set between signal and reference path. In short, the procedure of calibration is to calibrate the first leg of the differential signal path using a known reference level, and then repeat on the second leg. If there is no mismatch, the signal level produced on the first leg and the second leg through the signal path will be identical to that of reference path. In reality, it seldom happens. Normally a built-in mismatch in the signal path will cause the signal level on one leg to be higher, and the other leg lower than that of the reference. Ideally, the reference level is set to the middle of two signal levels. The resulting reference level setting will compensate the mismatch which can be as much as 50 mV. The calibration will avoid signal loss due to devices mismatch.

When the calibration step is over and the system is ready for the normal operation, set control pin SD_CAL=0, and the incoming differential signal pair DIN/DIP is now connected to the signal path ZDN and ZDP, and the output of the level generator RP and RN are connected only to the reference path RDP and RDN to continuously provide reference level.

Figure 5A:
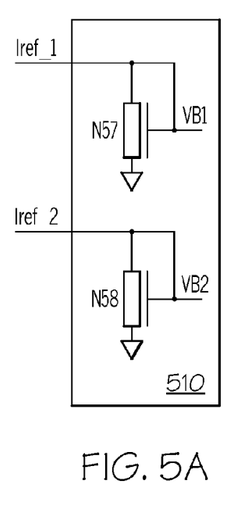
FIGS. 5A and 5B are schematic diagrams illustrating a merged buffer and level detector topology according to an embodiment of the invention.
Figure 5B:
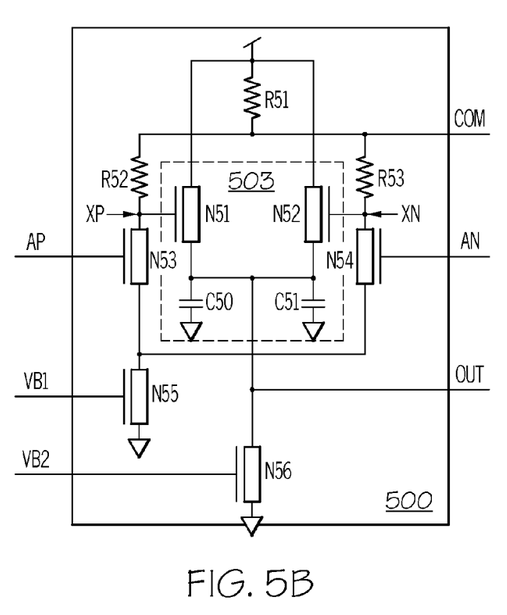

FIGS. 5B and 5A show schematics of a circuit for merged buffer detector 500 and voltage generating circuit 510 (FIG. 1). In the present invention to boost the gain of the signal at the frequency of interest, a merged buffer and level detector design is proposed (FIG. 5B). Here, the buffer 500 is comprised of two identical load resistors, units R52 and R53, two input devices N53 and N54, and a tail device N55. To lower the common mode of the buffer, as well as allow common mode to move up and down during calibration (describe herein after) an extra load R51 is attached. The outputs of the buffer are connected to the inputs of the level detector 503 formed by two input devices N51 and N52, two capacitors C50 and C51 and a tail device N56. In such an arrangement, the design is fully symmetrical. The gain and bandwidth of the integrated unit can be optimized together. Different reference current levels Iref-1, Iref-2 are mirrored via nMos devices N57 and N58, respectively (FIG. 5A).

In the past, to obtain maximum gain and bandwidth a pair of bulky peaking amplifiers was used. The drawback with the use of a peaking amplifier is the difficulty to control its gain, especially at the roll-off frequency. Such variation can easily exceed the whole signal detection window and results in signal detection failure. Normally, a peaking amplifier requires a relatively large shunt capacitor and resistor. To track signal variation, the reference path must also have an identical peaking amplifier, causing the size and the power of the circuits to become unacceptably large. In contrast, the present invention, replaces peaking amplifiers with high-gain, high-bandwidth buffers. Although the gain-bandwidth product of the buffer may not be comparable to that of peaking amplifier, the gain variation as a function of data rate, temperature and power supply is far superior. In addition, the size and power are much smaller than those of the peaking amplifier. In order, to achieve the best symmetry as well as robustness of the interconnection, the buffer and the peak detector are integrated together.

Figure 6:
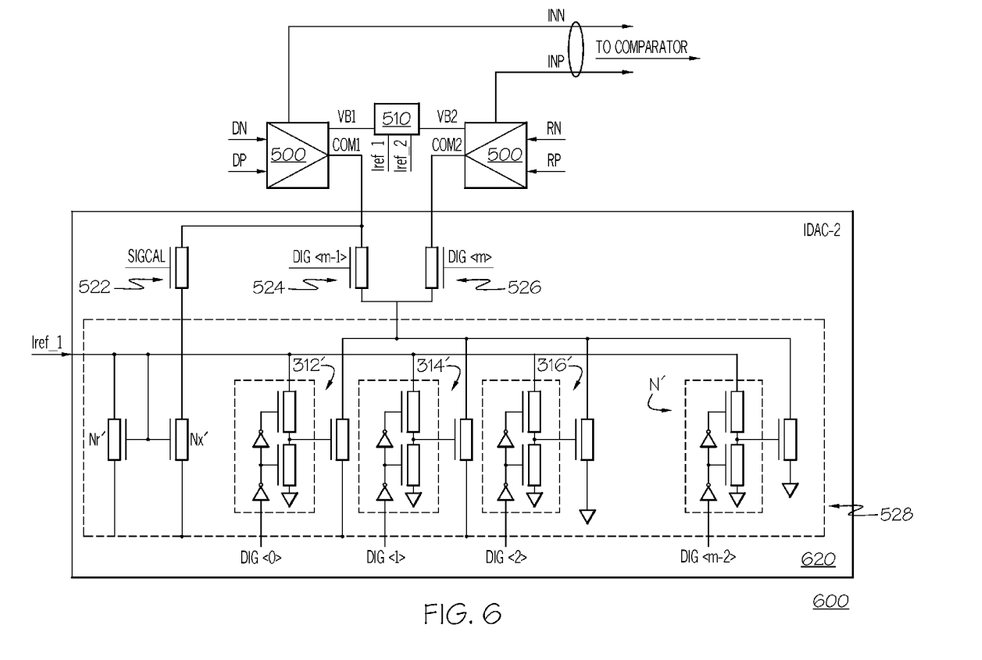
FIG. 6 is a schematic diagram of merged buffer/peak detector with the second tuning circuit IDAC-2 according to an embodiment of the invention.

FIG. 6 shows a more detailed schematic for the overall (complete) tunable merged buffer detector units (FIG. 1). The design includes identical buffer/detector 500 (details shown in FIG. 5), one being used for signal path which receives signals DN and DP, another one being used for reference path which receives signals RN and RP. The two buffer/detector units share the same bias block 510 with two different current references Iref1 and Iref2. The common mode node from each buffer/detector is outputted to the IDAC-2 (620) for DC offset calibration. IDAC-2 (620) includes nMOS devices 522, 524 and 526 coupled to sub-system 528 which is substantially similar to circuit 310 (FIG. 3). As a consequence, the description set forth above for circuit 310 is equally applicable to describe the circuit in sub-system 628 and is incorporated herein by reference. To distinguish between items in FIG. 3 and FIG. 5, like items in FIG. 5 are identified by prime notations. For example, $N_r$ (FIG. 3) is represented by $N_{r\_}$ (FIG. 5), $N_x$ (FIG. 3) is represented by $N_{x\_}$ (FIG. 6) and so forth.

Still referring to FIG. 6, the reference calibration unit 600 is designed to facilitate reference tuning to compensate DC offset. The set control pin set DIG<m> inputs are used for tuning the reference level to null out the mismatch. It is critical to have not only sufficient tuning range, but also a reasonable resolution for each tuning step. In one embodiment, the range is set to be about +/−50 mV and resolution is 2 mV. Noted that during calibration, control pin SIGCAL=1 which supplies extra current to the signal path. This is because the generated reference tends to have a slightly higher level when calibration is done in DC mode than if it is done in AC mode. Due to attenuation and ISI (inter symbol-interference) effects the signal amplitude is lower at a higher frequency than at DC. The extra current load will take this into account.

Still referring to FIG. 6, DC offset may occur within the signal path DN/DP, or reference path RN/RP, or both. There are several ways to nullify such DC offset. Since during calibration both signal and reference paths are fed with identical DC voltage level, without DC offset, the INN and INP levels will be identical and the output of the comparator 700 (FIG. 1) will have equal probability of being high and low. However, it is likely that DC offset may exist so that INN could be higher (or lower) than INP, and the output of the comparator can be high (or low). One calibration method is to tune the reference path output node "INP" up (or down) to match to the level of INN so that output of the comparator will flip from high to low (or low to high). Tuning only the reference side could run into a situation that the tail current of the reference peak detector could be too high which causes the peak detector on the reference path to function poorly. This is true especially when the DC offset exceeds the upper limit, e.g. 50 mV and above.

A preferred embodiment is to use common mode calibration to tune DC offset. It is to either lower the common mode of the signal peak detector or the common mode of the reference peak detector. More specifically, when DC offset causes signal path output node "INN" to be lower (or higher) than that of the reference "INP", the common mode of the reference (or signal) peak detector is lowered until "INN" and "INP" becomes sufficiently identical again.

Figure 7:
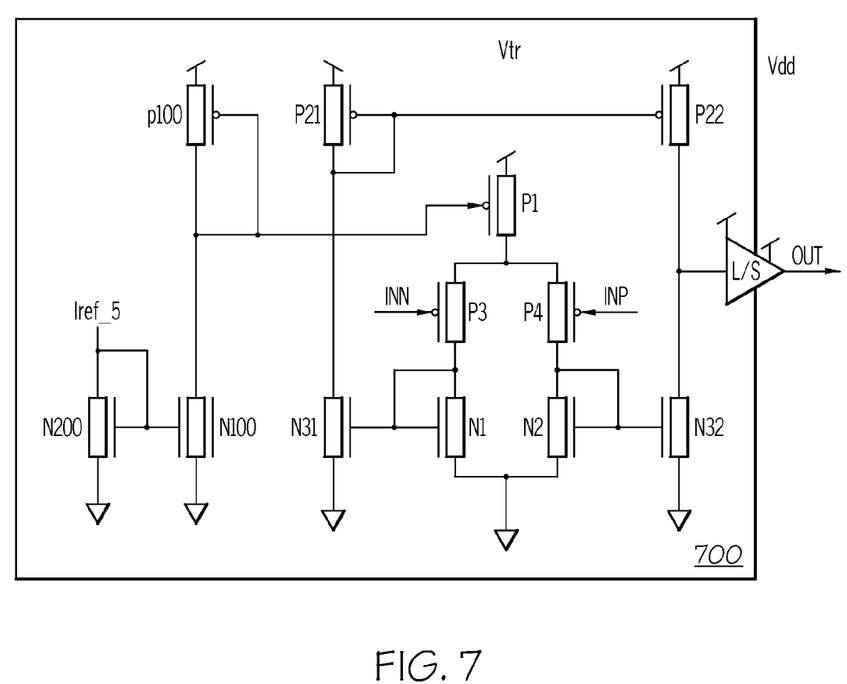
FIG. 7 is a schematic diagram illustrating a comparator according to an embodiment of the invention.

Shown in FIG. 7 is the comparator using two-stage CMOS op-amp topology. A reference current Iref5 is used to mirror the current to the tail device P1 via an nMOS device N100 and pMOS diode P100. The first stage of the op-amp is formed by the tail device P1, a pair of input pMOS devices P3 and P4 and a pair of pull-down nMOS diode devices N1 and N2. The complimentary outputs of the comparator are further boosted by the second stage formed by P22 and N32 (and P21 and N31). The output signals are level shifted lower from Vtr domain to Vdd domain via a level shifter L/S.

Still referring to FIG. 7, the key is to keep the topology as symmetrical as possible so that signal margin is maintained. A level shifter (L/S) is attached to the output of the comparator which shifts the output signal level from Vtr (the receiver external supply voltage usually a higher level) to Vdd (the receiver internal supply level voltage usually is lower). The level shifter is known in the art and thus is not further described. A pair of incoming signal INN and INP are received from the buffer and charge pump circuit block 500 (FIG. 6) and apply on two PMOS input devices P3 and P4. A mirror diode device N200 mirror a portion of current Iref5 to N100, and in turn N100 mirrors the same amount of current from P100 to a pMOS header device P1 to provide current to the comparator. The comparator comprises a pair of pull-down NMOS devices N1 and N2 and a pair of pull-up devices P3 and P4. The pull-up devices are the pMOS used to receive signals. The comparator has a cascaded second stage formed by P21, N31 and P22 and N32 for gain boosting. In this diagram we also indicate the zone that circuit operates in the Vtr level and that at Vdd level.

Still referring to FIG. 7, the two-stage comparator is used to compare the sensed signal INN and the generated reference INP. During calibration (describe below) the targeted signal level is a predetermined DC level which is set to the middle of the specification. For example, for the Infiniband specification, the signal range is between 87.5 mV and 42.5 mV, therefore the reference is calibrated to be around 65 mV. When INP level is higher than that of INN, the output of the comparator SigDet will be switched to high, logical "1", which means the reference is higher than 65 mV. After scanning through the vector bits DIG<m>, the final INP level will reach to INN level within +/−4 mV.

Figure 8A:
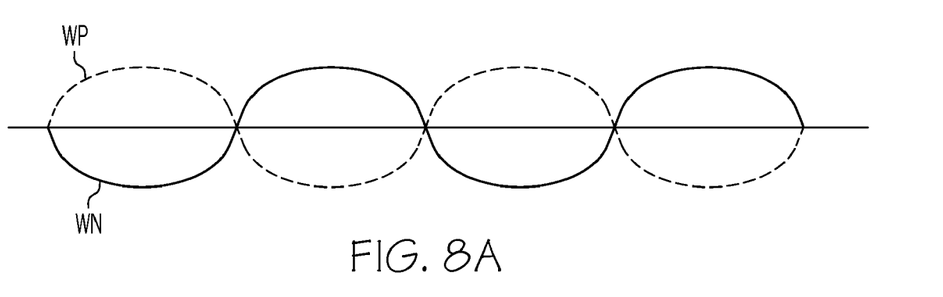
FIG. 8 shows incoming signals with various DC offsets according to an embodiment of the invention.
Figure 8B:
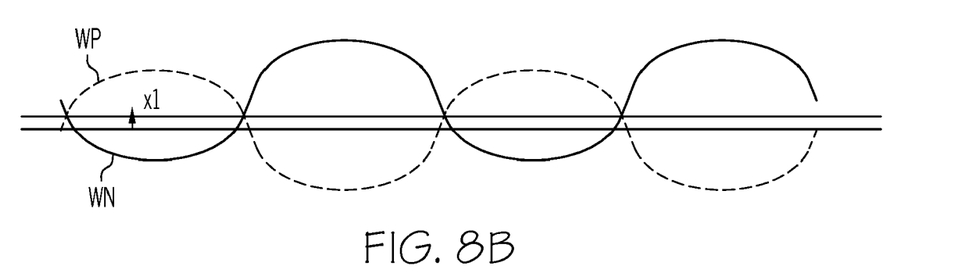
Figure 8C:
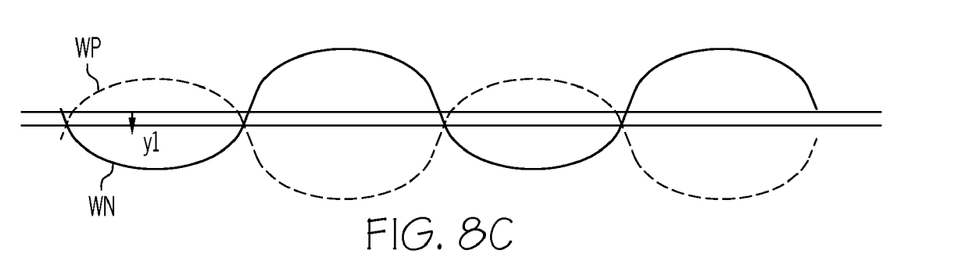

Before describing calibration according to teachings of the present invention, a short description of DC offset which makes calibration necessary will be given. FIG. 8 shows some simple examples of DC offset waveform diagrams and are helpful in understanding the problems caused by offsets. In a system without mismatch devices the complementary signal pair will have a symmetrical shape with a common mode level located right at the signal cross-over points (FIG. 8A). In this case signals can be accurately detected by using either one of the complimentary pair WP or WN via the existing level detector. However, this rarely occurs in real life. DC offset due to mismatch will skew one of the differential signals. As illustrated in FIG. 8B, WN is skewed while WP is not or vice versa (see FIG. 8C). At this point, signal (or noise) level would be affected by the skew. For example, in FIG. 8B more noise (or signal) level will be detected when using WN waveform, and in FIG. 8C less signal (or noise) level will be detected when using WP waveform. To avoid such a problem it is desirable to eliminate the DC offset component from the system during a calibration mode describe herein after.

Figure 9:
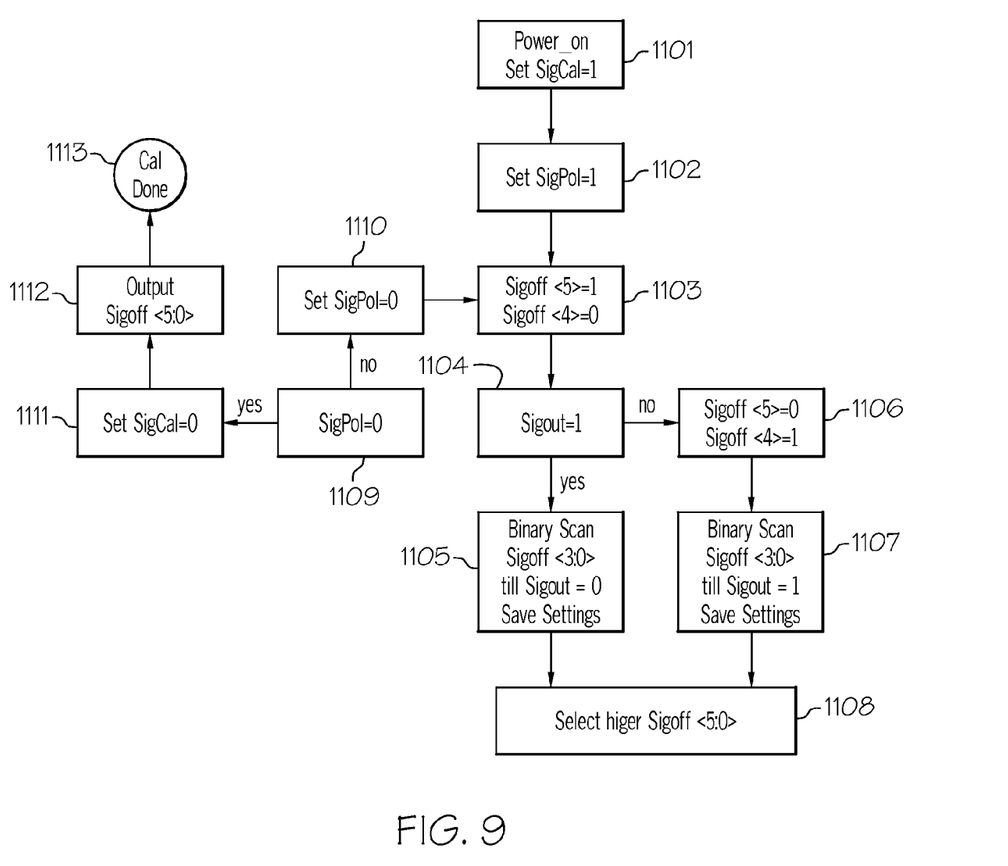
FIG. 9 is a diagram illustrating a flow chart of a program used to calibrate the signal detector.

As shown in FIG. 9, a flow chart for a calibration algorithm in form of a state machine can be embedded in a logic block 1100 (FIG. 1). The calibration algorithm sets forth a procedure that calibrates or tunes the signal detector. In this flow chart, during power on, a DC offset calibration is activated automatically. It is proper to wait for a predetermined period of time until the chip temperature and voltage supply levels become stabilized before starting the calibration procedure. Otherwise, the calibrated setting may not be accurate during normal operating mode when temperature and power supply level may be significantly different than those during the calibration period.

Still referring to FIG. 9, during power on the system triggers the calibration by setting the control pin SigCal or SDCal (FIG. 4)=1 (step 1101). It then sets another control pin SigPol or SD_Pol (FIG. 4)=1 to choose the first leg of the differential pair (FIG. 4) for calibration (step 1102). It further sets the MSB (most significant bit) of the digital offset correction pin Sigoff<5> or DIG<m>=1 (FIG. 6) and the second MSB offset correction pin Sigoff<4> or DIG<m−1> (FIG. 6)=0 (step 1103), and checks the output of the comparator 700 (FIG. 1) to see if Sigout=1 (step 1104). If Sigout=1, which means the signal level is higher than the reference level, a positive DC offset exists in the current signal leg being tested. At this point, calibration will take place to lower the common mode of the level detector of the signal path to compensate the positive offset until the output of the comparator becomes low. The calibration step will scan or step through the rest of the four Sigoff<3:0> bits (FIG. 6) in a binary search manner (step 1105) setting them at values to lower the common mode of the detector. Once this step is done the Sigoff<5:0> bits are stored temporarily for a subsequent comparison.

It is evident from the above that for this example m=5. The most significant bit was set to 1 and the settings at the remaining four (4) bits (0, 1, 2, 3) were adjusted until the output of the comparator becomes low. However, this teaching should not be construed as a limitation on the scope of the present invention since it is well within the skill of one skilled in the art to other values for m without deviating from the teachings and claims of the present invention.

Still referring to FIG. 9, if Sigout=0 at step 1104, this means that a negative offset exists in the current leg of the signal path. At this point, the following settings are made. The MSB bit Sigoff<5>=0 and the second MSB bit Sigoff<4>=1 indicating that the common mode level of the level detector in the reference path must still be calibrated to compensate for the negative DC offset (step 1106). Again, the calibration step will scan through the remaining four Sigoff<3:0> bits in a binary search manner (step 1107) setting the bits at selected values until the Sigout=1. The settings save at step 1105 and step 1107 are compared and the higher of the two is selected (block 1108) as calibration setting for the current leg. After the first leg of the differential pair is calibrated, the system will move on to calibrate the second leg by setting SigPol=0 and repeat the same procedure described above to get another set of Sigoff<5:0> settings. Now, the higher of the two settings is picked and shifted to the signal detector to set the IDAC-2. In order to get the state machine ready for the next calibration during power-on, the SigCal is reset to zero (step 1111), and the whole calibration procedure is done (step 1113).

Based on the teachings of the present invention, a variety of calibration schemes can be derived. For example, once the calibration is done during power-on period the calibration settings can be stored in a register bank. Signal detector can then be calibrated periodically or on-demand. The calibration switch device proposed here can effectively block the incoming signals when it is activated. Therefore, the receiver can still function normally without any interruption during such in-situ calibration. The output of the signal detector can also be stored in a latch register so that calibration-on-the-fly (COTF) is invisible to the system. Such calibration can be triggered by a calibration clock similar to the refresh clock of a DRAM design. It can also be triggered by an on-chip or on-package temperature sensor. In other words, when temperature has drifted outside the calibration range, it calls for a new calibration. One advantage of calibration-on-the-fly is the signal detector can be made smaller, since the bulky tracking device can all be avoided. It is conceivable that the time required for the hidden COTF is reasonably short, on the order of micro-seconds. The COTF can also be triggered whenever an invalid signal is detected by the system. It is critical for the system to confirm that the absence of the valid signal is real. In this case, the signal detector can confirm the absence of signals when signal detector fails to detect the signals again after a recalibration. Otherwise, the recalibrated signal detector can continue to provide service to the receiver core. Calibration on the fly effectively eliminates signal error caused by short-term or long-term environmental changes.

While the invention has been described with reference to certain preferred embodiments thereof, those skilled in the art will understand the many modifications and enhancements which can be made without departing from the true scope and spirit of the invention, which is to be construed to cover all such modifications and enhancement that may fall within the scope of the appended claims.

We claim:

1. A method comprising:
   generating, with a merged buffer detector, a first single ended signal associated with differential reference level signals received from a first communication channel and a second single ended signal associated with differential signals received from a second communication channel;
   analyzing the first single ended signal and the second single ended signal to determine if a DC offset component is present in differential signals associated with one of the single ended signal; and
   calibrating, with a programmed calibrator, the differential signals associated with the communication channel having the DC off-set.

2. The method of claim 1 further including generating the differential reference level signals with a multi-level signal generator;
   propagating the differential reference level signals along the first communication channel and the second communication channel; and
   receiving in the merged buffer detector the differential reference level signals propagated through the first communication channel and the second communication channel.

3. The method of claim 1 wherein generating single ended signal further includes buffering in a first buffer the differential reference level signals received from the first communication channel; and
   buffering in a second buffer the differential reference level signals received from the second communication channel.

4. The method of claim 3 further including storing on a first storage device buffered signals from the first buffer and storing on a second storage device buffered signals from the second buffer.

5. The method of claim 1 wherein the differential reference level signals are being generated based upon specification for a system in which the method is being implemented.

6. The method of claim 5 wherein the specification includes Infiniband architecture.

7. The method of claim 1 wherein determining DC offset component includes selecting one of a pair of conductors transmitting the differential reference level signals containing said DC off-set component; and
   monitoring an output of a comparator to detect the state of said output.

8. The method of claim 7 wherein if the state of said output is a logical "1", the DC offset is positive.

9. The method of claim 7 wherein if the state of said output is a logical "0", the DC offset is negative.

10. The method of claim 1 wherein calibrating includes setting bits on selected control lines on said programmable calibrator to initial values; and
    changing settings of bits on other selected control lines of said programmable calibrator until an output from the comparator is at a predefined state.

11. A method comprising:
   generating, with a merged buffer detector, a first single ended signal associated with differential reference level signals received from a first transmission channel and a second single ended signal associated with differential reference level signals received from a second transmission channel,
   selecting for calibration one of a pair of conductors carrying the differential reference level signals in the first transmission channel;
   using the first single ended signal and the second single ended signal to determine DC offset associated with said one of the pair of conductors so selected; and
   calibrating, with a programmable calibrator, said one of the pair of conductors to remove the DC offset.

12. The method of claims 11 further including selecting for calibration another of the pair of conductors;
   using the first single ended signal and the second single ended signal to determine DC offset associated with said another of the pair of conductors; and
   calibrating, with a programmable calibrator, said another of the pair of conductors to remove the DC offset associated with said another of the pair of conductors.

13. The method of claim 11 wherein DC off-set is being determined by comparing in a comparator the first single ended signal and the second single ended signal and monitoring an output of said comparator to detect its state.

14. The method of claim 13 wherein DC offset is positive if the state of the output is a logical "1".

15. The method of claim 13 wherein the DC offset is negative if the state of the output is a logical "0".

16. The method of claim 11 wherein the calibrating further includes allocating n (n>1) bits to control said programmable calibrator;
   using at least one of, the n bits to set a boundary condition on a control line into said programmable calibrator;
   associating each one of remaining n bits with other control lines of said programmable calibrator; and
   changing values of the remaining n bits until a logical "0" is detected at the output.

17. The method of claim 16 wherein n=5.

18. The method of claim 17 wherein a most significant bit of allocated bits is used to set the boundary condition.

19. A signal detector circuit comprising:
   a first pair of conductors for receiving differential incoming signals;
   a level generator, operatively coupled to the pair of conductors, generating differential reference level signals;
   a switching circuit arrangement coupling outputs of said level generator to the pair of conductors;
   a merged buffer detecting system coupled through separate pairs of conductors to the switching circuit arrangement;
   a calibration circuit arrangement operatively coupled to the merged buffer detector system; and
   a comparator operatively coupled to separate outputs from said merged buffer detector system.

20. The signal detector circuit of claim 19 wherein the level generator includes a differential amplifier;
   a pMOS device with a base electrode coupled to the differential amplifier;
   a first pair of series connected resistors connected to the source of said pMOS device;
   a feedback conductor interconnecting a node intermediate said resistors and an input to said differential amplifier;
   a second pair of series connected resistors having end points coupled to the pair of conductors and intermediate point coupled to the differential amplifier; and
   a controller for providing tail current operatively coupled to the differential amplifier and the first pair of series connected resistors.

21. The signal detector circuit of claim 20 wherein the controller includes a current based-digital-to analog converter (IDAC);
   a first input to receive a reference current; and a second input to receive control bits.

22. The signal detector of claim 21 wherein the IDAC includes a main diode having drain and gate electrodes connected to a first node;
   a first NMOS device mirroring current from the main diode to a second node; and
   a second NMOS device mirroring current from the main diode to a third node.

23. The signal detector of claim 22 further including a plurality of NMOS devices connected in parallel with each one having a drain electrode connected to the third node and a gate electrode connected to a digital control circuit.

24. The signal generator of claim 23 wherein the digital control circuit includes a pair of NMOS devices connected in series; and
   a pair of series connected inverters with an output from one of the pair of series connected inverters connected to a gate electrode of one of the series-connected NMOS devices and an output from another of the pairs of series connected inverters connected to the gate electrode of another of the series connected NMOS devices.

25. The signal detector circuit of claim 19 wherein the switching circuit arrangement includes a plurality of switch sets operatively coupled together with a first one of the switch sets when activated blocks transmission of the differential incoming signals;
   a second one of the switch sets causing the differential reference signals to be coupled onto the first pair of conductors;
   a third one of said switch sets causing a reversal of polarity of the differential reference signals on said first pair of conductor; and
   a fourth one of said switch sets coupling the differential references signal onto a second pair of conductors.

26. The signal detector of claim 25 further including a multiplexer logic block coupled to the second one of said switch sets and the third one of said switch sets.

27. The signal detector of claim 25 wherein each one of said switch sets includes a pair of PMOS devices connected at gate electrodes.

28. The signal detector of claim 26 wherein the multiplexer logic block includes a first NAND gate;
   a first inverter connected to an output of said first NAND gate;
   a second NAND gate;
   a second inverter connected to an output of said second NAND gate;
   a first conductor interconnecting first inputs on the first and second NAND gates;
   a third inverter with input connected to a second input of said first NAND gate and output, connected to a second input of said second NAND gate.

29. The signal detector of claim 19 wherein the merged buffer detecting system includes a pair of merged buffer detectors wherein one of said pair of merged buffer detectors is coupled to one of the separate pairs of conductors and another of said pair of merged buffer detectors coupled to another of said separate pairs of conductors; and a bias circuit block coupled to the pair of merged buffer detectors.

30. The signal detector of claim 29 wherein each of the merged buffer detectors includes a first buffer circuit for receiving differential signals and nodes for outputting signals; and a detector circuit operatively coupled to the nodes.

31. The signal detector of claim 19 wherein the calibration circuit arrangement includes a digital controller for adjusting current flow through the merged buffer detecting system.

32. The signal detector of claim 31, wherein the digital controller includes a first set of M devices (M>0) each having a source electrode connected to a first node and a drain electrodes connected to a second node;

at least one conductor for receiving a vector bit signal;

N control circuits, each dedicated to switch one of the M devices based upon setting of the vector bit signal; and a main diode device supplying current to the N control circuits.

33. The signal detector of claim 32 further including a current mirror mirroring current from the main diode;

a device operatively coupled to the current mirror; and a conductor for receiving a control signal connected to a gate electrode of said device.

34. The signal detector of claim 32 wherein at least one of the N control circuits includes two devices connected in series to a gate electrode of one of said M devices; and a pair of series connected inverters with an output from a first one at the pair of series connected inverters connected to a gate electrode of a first one of the two series connected devices and an output from a second one of the pair of series connected inverters connected to a gate electrode of a second one of said two series connected devices.

35. The signal detective of claim 34 wherein channel width of the M devices are arranged in a binary order.

* * * * *